Jan. 15, 1957  S. S. GUTERMAN  2,778,006
MAGNETIC CONTROL SYSTEMS
Filed Feb. 23, 1955  2 Sheets—Sheet 1

INVENTOR
SADIA S. GUTERMAN
BY Elmer J. Gorn
ATTORNEY

Jan. 15, 1957

S. S. GUTERMAN 2,778,006

MAGNETIC CONTROL SYSTEMS

Filed Feb. 23, 1955

INVENTOR
SADIA S. GUTERMAN
BY Elmer J. Gorn
ATTORNEY

United States Patent Office 2,778,006
Patented Jan. 15, 1957

2,778,006

MAGNETIC CONTROL SYSTEMS

Sadia S. Guterman, Dorchester, Mass., assignor to Raytheon Manufacturing Company, Waltham, Mass., a corporation of Delaware Application February 23, 1955, Serial No. 489,989

13 Claims. (Cl. 340—174)

This invention relates to magnetic control systems, and particularly to the storage and transmission of electrical energy representative of numerical digits to be counted or informational or logical components to be utilized in a computing operation or in a machine or apparatus for controlling functional sequences.

The invention is characterized by an automatic recycling action (in the nature of servo-loop) making possible the maintenance of a supply of magnetic core saturation controlling pulses to the successive stages of a saturable core type of magnetic shift register, so that informational signals may be caused to advance progressively through such successive stages in a continuing process that repeats itself automatically in accordance with a control pattern dictated by said informational signals and operating by retriggering the source of driving energy constituting the point of origin of said saturation-controlling (core-shifting) pulses. This is in contrast to prior systems which required an independent act of intervention to repeat each core-shift pulse.

The invention is further characterized by the provision of means whereby the content of the progressively advanced informational signals is caused to conform to a control pattern whose design is prearranged in a manner to cause automatic termination of the retriggering sequence when the preselected number of core-shift pulses have been applied, that is, when the "digital servo-loop," as it may be termed, has run its course.

These and other characteristics of the invention will be apparent as the description thereof progresses, reference being had to the accompanying drawings wherein.

Figure 1:
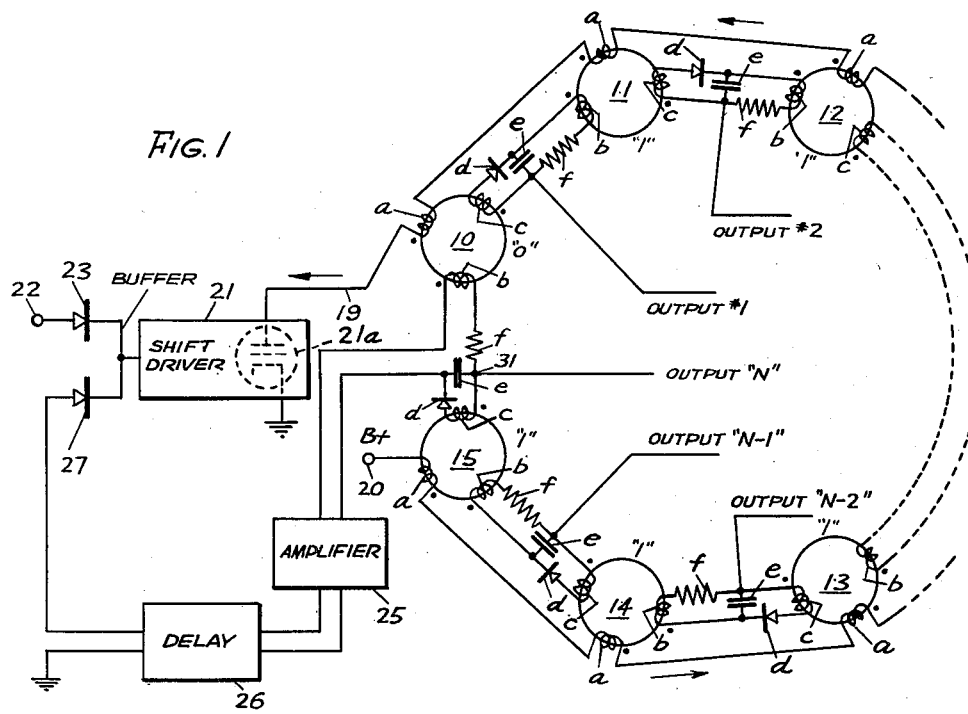
Fig. 1 is a diagram of electrical components and connections embodying the invention.

Referring first to Fig. 1, the arrangement illustrated includes a serially connected group of magnetic cores 10 to 15, inclusive, which group is only partially illustrated in Fig. 1, with dash lines indicating the omitted cores of the group, numbering one or more as conditions dictate. The complete group constitutes what is commonly termed a shift register, with each core being in the form of a ring of ferromagnetic material having high magnetic retentivity and a relatively open hysteresis loop characteristic, preferably approaching the rectangular shape, so that a digital value stored in a given core will tend to remain therein until removed by subjecting the magnetic field of the core to a pulse current of sufficient amplitude and proper polarity to drive the core from its pre-existing state of saturation in one magnetic polarity to the opposite polar state of saturation. Each core has a "shift" winding $a$ to receive the shift pulse current, a signal input winding $b$ to receive the signal energy, and a signal output winding $c$ to transfer signal energy to the adjacent core by way of the intervening unidirectional impedance element $d$ and the intervening delay network consisting of condenser $e$, resistor $f$ and whatever additional delay network elements may be included for the purpose of delaying the delivery of the signal energy to the input winding of the adjacent core for a sufficient time interval to assure completion of the "read-out" of the preceding signal, if any, from said adjacent core in response to the application of the shift pulse to the shift winding $a$ of said adjacent core.

The shift pulse current flows through all of the shift windings $a$, in series, from the B+ source 20, when the series circuit 19 from said source is made operative, as by triggering of the driver circuit shown in block form at 21, and including as its final stage an amplifier tube 21a whose plate circuit is an integral part of the shift circuit 19. The driver 21 may be triggered by way of buffer diode 23 which connects a source 22 with said driver.

Let it be assumed that, at the time of delivery of this first shift pulse to winding $a$ of core 10, the direction of flux saturation of core 10 is such as to correspond to the predesignated condition for representation of a "0" binary digital value. Let it further be assumed that all other cores of the group are at the same time standing in a flux saturation polarity inverse to that of core 10, in other words, in the condition for representation of a "1" binary digital value. Under such conditions the first shift pulse passing through circuit 19 (assuming such pulse to be of the correct polarity for the purpose) will cause the "1" values to be stepped along progressively, with the "read-out" current generated in winding $c$ of core 15 being delivered to driver 21 by way of delay network 26 and buffer diode 27. If desired, the "read-out" current, instead of passing to delay network 26, may be used to trigger an amplifier 25 whose output circuit will then constitute the input line to delay network 26. Meanwhile the said first-applied shift pulse has operated to read into the core 10 a "1" value (by transfer of energy from 15c to 10b) while core 11 has reverted to a "0"-representing condition, due to the transfer of its "1" value to core 12, and due further to the absence of any new energization of its input circuit 11b. The retriggering servo loop will continue for "N−1" pulse periods, if the number "N" be considered to represent the number of cores in the register. On the Nth pulse occurrence however, there will be a termination of the retriggering cycle, for on that occasion the output of winding 15c will drop to zero, due to the "0"-representing condition having been stepped along to reach said core 15 on said Nth pulse period. In other words, every Nth signal period will produce a "0" signal value in core 10, which "0" signal value will be progressively stepped along the series of cores, resulting finally in an omission of a pulse delivery from output point 31 (Fig. 1) to amplifier 25. On that occasion, occurring on each Nth signal period, there will therefore be an absence of delivery of a triggering pulse to driver 21, hence a termination of the automatic recycling of the shift register drive. On each such termination, the drive can be recycled independently, of course, by the transmission of a new triggering pulse over the upper diode path 22—23.

During each sequence of N shift pulses, the pulse repetition rate will have a value that will depend upon the time interval for passage of the recycling pulse through delay network 26. Network 26 should of course be so designed and adjusted as to conform to the design parameters of the core group 10 to 15, considered as an entity.

In lieu of carrying a digital pattern of a single "0" value and N−1 "1" values, it is more convenient to carry a pattern of a single "1" value and N−1 "0" values. Such a reverse pattern can be utilized to operate the recycling circuit 25—26—27 by interposing in such circuit a "1" generating core, as indicated at 24 in Fig. 2, and a coincidence-responsive inhibiting core, as indicated at 30 in Fig. 2. Such a combination of value-reversing cores will function to reverse the effect of the Fig. 1 circuit, that is, to produce energy flow in circuit 25—26—27 during each pulse period that is marked by an absence of energy output at core output point 31, and to produce no energy flow in circuit 25—26—27 on each Nth period occurrence, when output energy appears at point 31. The pertinent portions of electrical connections and core components that may be chosen to carry out the Fig. 2 scheme of operation are shown more fully in Fig. 3 wherein the various components may be identified with their Fig. 1 or Fig. 2 counterparts bearing corresponding legends.

Figure 2:
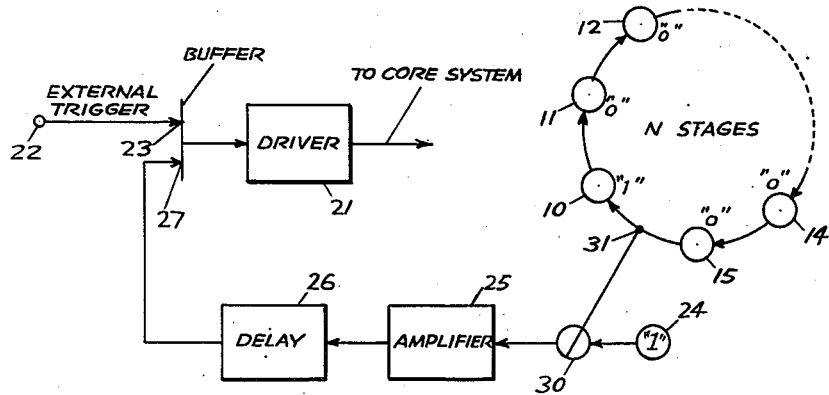
Figs. 2 and 3 are, respectively, schematic and circuit diagrams indicating a second embodiment.
Figure 3:
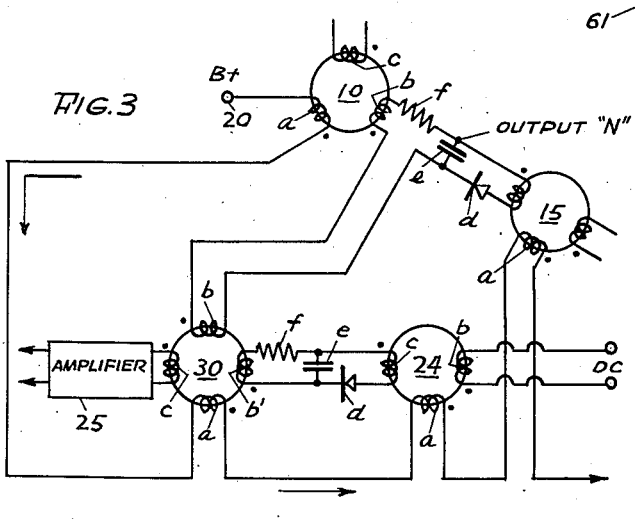

As shown in Fig. 3 the core 24 has its input winding $b$ connected to a direct current source; hence its saturation polarity remains unchanged during successive applications of shift pulse current to its shift winding $a$, interposed serially in the shift pulse circuit supplying the shift windings $a$ of all other cores, including the recycling control core 30. The latter core has two input windings, $b$ and $b'$, the former being in series with input winding $b$ of core 10, but wound oppositely on its core 30, while input winding $b'$ receives the output of "read-out" winding $c$ of core 24, and has a direction of winding opposite to that of input winding 30b. With this arrangement there will be a generation of an output pulse in winding 30c, for delivery to amplifier 25, with resultant retriggering of driver 21, upon each occasion of application of shift current to windings 30a and 24a, provided there is a concurrent absence of energy flow in the circuit containing windings 10b and 30b, in other words, so long as the sequence of "0" output periods is still prevailing. As the sequence changes to a "1" output, represented by energy flowing into core 30 by way of input 30b, such energy flow will inhibit the cotemporaneous, oppositely acting input to winding 30b', with the result that the train of energy pulses passing to amplifier 25 will be interrupted, due to the mutually canceling effect of the two oppositely acting inputs at 30b and 30b'. Thus the retriggering control pattern or "servo-loop" terminates itself with the delivery of the Nth shift pulse, in a closed-circuit type of shift register having N stages, such as the shift registers represented in Figs. 1 and 2. By a "closed-circuit" type of shift register is meant a register in which the output of the final stage (core 15 in Figs. 1 and 2) feeds around into the initial stage (core 10 in Figs. 1 and 2) to condition the register for the next cycle of operation.

Figure 4:
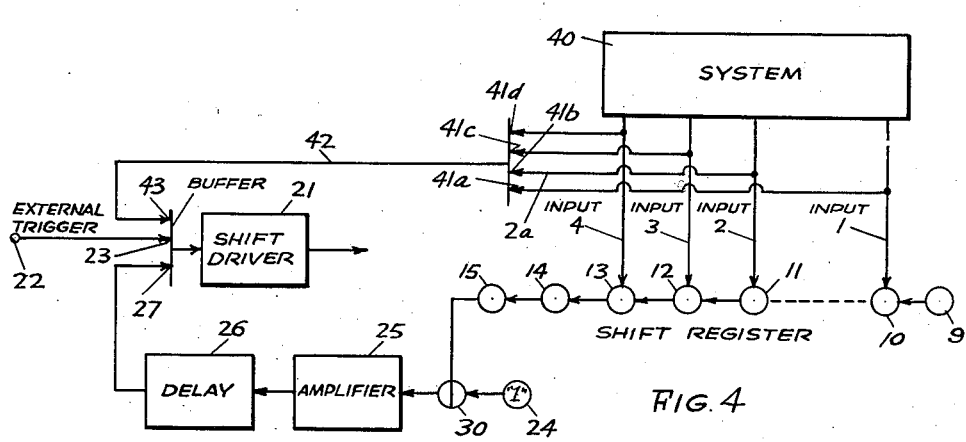
Figs. 4 and 5 are block diagrams of additional embodiments.

Fig. 4 indicates schematically a type of shift register differing from the "closed-circuit" type of Figs. 1 and 2 in that the initial input signal, instead of being derived from the final stage (core 15), originates in one or another of a series of selective input lines 1, 2, 3 and 4 feeding the input windings of cores 10, 11, 12 and 13, respectively. These lines may constitute components of a machine or apparatus controlling computing operations or logical functions in an automation system (represented schematically at 40 in Fig. 4) of industrial or service-rendering controls, such as a ticket preparing and dispensing control system, or analogous apparatus. In the application of the present invention to such a use, as illustrated in Fig. 4, the number of shift pulses constituting the selected recycling train ("servo-loop") will depend upon whether the system 40, on any given occasion, functions to send an energy input signal down line 1, or down one of the alternate lines 2, 3, or 4 (assuming the number of control lines to be four). If line number 2 is selected, there will be a simultaneous delivery of a triggering pulse to shift driver 21, by way of line 2a, buffer diode 41b, line 42, and buffer diode 43, and this will be followed in due course by retriggering pulses delivered to buffer diode 27; that is, there will be one such retriggering pulse for each stage of the shift register embraced between the initially operating stage (stage number 11 in the example under discussion) and the final stage 15. The recycling will then terminate itself by reason of the delivery, down the selected line 2, of an input signal of terminating significance, a "1," if the preceding train of signals have been zeros, and a "0," if the preceding signals have been of "1" value. This Fig. 4 arrangement may or may not include, as desired, units 24, 25, and 30, corresponding to those similarly designated in Fig. 2.

Figure 5:
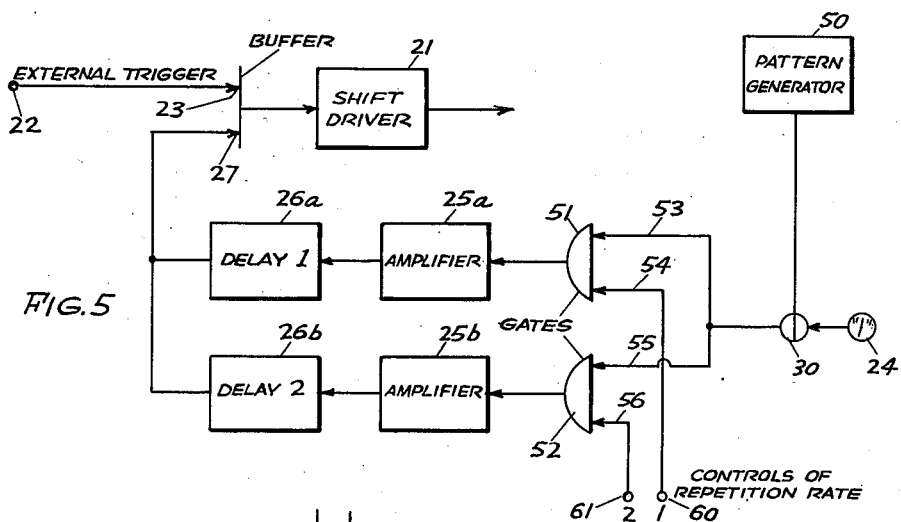

If it is desired to provide for selection of one or another of two or more different delay intervals in order to vary the repetition rate to meet varying requirements, the arrangement illustrated schematically in Fig. 5 may be adopted. Referring to Fig. 5, two or more delay networks, as indicated at 26a and 26b, each with a different delay characteristic, may be connected in series with amplifiers 25a and 25b, respectively, and in series with coincidence gates 51 and 52, respectively, the latter being in parallel relation to each other, and having parallel input lines 53, 54, 55 and 56, two of which are supplied with the output of shift register 50 by way of pattern output reversing unit 30 (controlled by "1" generator 24, and corresponding to the core 30 of Figs. 2, 3 and 4) and the other two by signal sources 60 and 61, representing the time interval selection means. With such an arrangement either delay unit 26a or unit 26b can be made effective, to the exclusion of the other, according to whether source 60 or source 61 is utilized as the gate control instrumentality.

This invention is not limited to the particular combinations of construction, materials and processes described, as many equivalents will suggest themselves to those skilled in the art. It is, accordingly, desired that the appended claims be given a broad interpretation commensurate with the scope of the invention within the art.

What is claimed is:

1. A magnetic control system comprising a plurality of saturable magnetic cores of substantial remanence and a relatively open hysteresis loop characteristic having saturation controlling windings serially connected to an energizing source, driver means for controlling flow of energy from said source to said windings, means for applying an initial triggering pulse to said driver means, and means controlled by the flux conditions in the respective cores to apply a predetermined number of additional triggering pulses to said driver means.

2. A control system as defined in claim 1, wherein said additional triggering pulse applying means includes a circuit receiving the energy output of a selected one of said magnetic cores.

3. A control system as defined in claim 1, including unidirectional buffer means facilitating successive operation of said two pulse applying means.

4. A control system as defined in claim 1, wherein said additional triggering pulse applying means includes a circuit receiving the energy output of a selected one of said magnetic cores, and delay means in said circuit for controlling the pulse repetition rate.

5. A control system as defined in claim 1, wherein said cores constitute a signal shift register of multiple stages equal in number to the number of cores comprising the register, and wherein said additional triggering pulse applying means includes a circuit receiving the signal energy output of the final stage of said register.

6. A control system as defined in claim 1, wherein said cores have interlinking signal transfer circuits, and wherein said additional triggering pulse applying means includes a circuit supplied directly from one of said interlinking signal transfer circuits.

7. A control system as defined in claim 1, wherein said cores are arranged in a series for progressive transfer of information-representing current toward the final core of the series, and wherein said additional triggering pulse applying means includes a circuit supplied with information-representing current generated at said final core.

8. A magnetic control system comprising a plurality of magnetic cores of substantial remanence and a relatively open hysteresis loop characteristic, each having signal input and output windings, and a third winding controlling transfer of signals from core to core by way of said input and output windings, driver means for controlling flow of energy to said third winding, and means controlled by the signal content of said cores for applying triggering pulses to said driver means.

9. A magnetic control system comprising a plurality of magnetic cores of substantial remanence and a relatively open hysteresis loop characterstic having signal transfer control windings, driver means for controlling flow of actuating energy to said windings, means for applying an initial triggering pulse to said driver means, and means controlled by the signal content of said cores for applying additional triggering pulses to said driver means.

10. A magnetic control system comprising a plurality of magnetic cores of substantial remanence and a relatively open hystersis loop characteristic, each having signal input and output windings and a third winding controlling transfer of signals from core to core by way of said input and output windings, driver means for controlling flow of energy to said third winding, means for applying an initial triggering pulse to said driver means, and means controlled by the signal content of said cores for applying additional triggering pulses to said driver means.

11. A digital servo-loop comprising a plurality of serially-connected current-generating magnetic elements of substantial remanence and a relatively open hysteresis loop characteristic, an output circuit adapted to register a digit-representing voltage in response to flux reversal in said magnetic elements, and means for producing said flux reversal, said means including a driver circuit, and means operated by said digit-representing voltage for triggering said driver circuit.

12. A digital servo-loop comprising a plurality of serially-connected current-generating magnetic elements of substantial remanence and a relatively open hysteresis loop characteristic, an output circuit adapted to register a digit-representing voltage in response to flux reversal in said magnetic elements, means for producing said flux reversal, said means including a driver circuit, and means operated by said digit-representing voltage for triggering said driver circuit a predetermined number of times in accordance with a control pattern, and means for applying said control pattern to said magnetic elements in response to operation of said driver circuit.

13. A digital servo-loop comprising a plurality of serially-connected current-generating magnetic elements of substantial remanence and a relatively open hysteresis loop characteristic, a driver circuit, an output circuit adapted to register a digit-representing voltage in response to operation of said driver circuit, and means actuated by said digit-representing voltage for triggering said driver circuit.

References Cited in the file of this patent
UNITED STATES PATENTS 2,673,337     Avery  ---------------- Mar. 23, 1954